United States Patent
Kwon et al.

(10) Patent No.: US 9,250,739 B2
(45) Date of Patent: Feb. 2, 2016

(54) TOUCH SENSING DEVICE AND TOUCHSCREEN DEVICE

(71) Applicant: SAMSUNG ELECTRO-MECHANICS CO., LTD., Suwon (KR)

(72) Inventors: Yong Il Kwon, Suwon (KR); Moon Suk Jeong, Suwon (KR); Tah Joon Park, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 162 days.

(21) Appl. No.: 13/912,814

(22) Filed: Jun. 7, 2013

(65) Prior Publication Data

US 2014/0267144 A1 Sep. 18, 2014

(30) Foreign Application Priority Data

Mar. 15, 2013 (KR) .................. 10-2013-0027991

(51) Int. Cl.
*G06F 3/044* (2006.01)
*G06F 3/041* (2006.01)

(52) U.S. Cl.
CPC .............. *G06F 3/0416* (2013.01); *G06F 3/044* (2013.01)

(58) Field of Classification Search
CPC ................. G06F 3/044; G06F 3/041; G06F 2203/04111; G06F 2203/04112
USPC ........................................................ 345/174
See application file for complete search history.

(56) References Cited

U.S. PATENT DOCUMENTS

| 8,508,257 | B2 * | 8/2013 | Kapusta et al. | 327/94 |
| 8,570,052 | B1 * | 10/2013 | Mahartya | 324/658 |
| 2010/0013779 | A1 * | 1/2010 | Wu | 345/173 |
| 2011/0109585 | A1 * | 5/2011 | Kwon et al. | 345/174 |
| 2012/0032826 | A9 * | 2/2012 | Li | 341/122 |
| 2012/0043977 | A1 * | 2/2012 | Kremin et al. | 324/686 |
| 2012/0169701 | A1 | 7/2012 | Son et al. | |
| 2012/0256868 | A1 * | 10/2012 | Choi et al. | 345/174 |
| 2014/0176482 | A1 * | 6/2014 | Wei et al. | 345/174 |

FOREIGN PATENT DOCUMENTS

| KR | 10-2011-0026812 | 3/2011 |
| KR | 10-2012-0036619 | 4/2012 |
| KR | 10-1198359 | 10/2012 |

OTHER PUBLICATIONS

Korean Office Action issued May 19, 2014 in corresponding Korean Patent Application No. 10-2013-0027991.

* cited by examiner

*Primary Examiner* — Towfiq Elahi
*Assistant Examiner* — Bryan Earles
(74) *Attorney, Agent, or Firm* — NSIP Law

(57) ABSTRACT

There are provided a touch sensing device and a touchscreen device. The touch sensing device according to an embodiment of the invention may include: a buffer unit including a buffer capacitor charged and discharged by a first voltage and a second voltage input at a predetermined period; an integrating circuit unit integrating a charging voltage of the buffer capacitor; a signal conversion unit comparing a voltage output from the integrating circuit unit with a predetermined reference voltage to generate the second voltage; and a touch determination unit counting the second voltage with a predetermined reference clock to determine a touch.

18 Claims, 8 Drawing Sheets

TOUCH SENSING DEVICE AND TOUCHSCREEN DEVICE

CROSS-REFERENCE TO RELATED APPLICATIONS

This application claims the priority of Korean Patent Application No. 10-2013-0027991 filed on Mar. 15, 2013, in the Korean Intellectual Property Office, the disclosure of which is incorporated herein by reference.

BACKGROUND OF THE INVENTION

1. Field of the Invention

The present invention relates to a touch sensing device and a touchscreen device.

2. Description of the Related Art

A touch sensing device, such as a touchscreen, a touch pad, and the like, an input device attached to a display device to provide an intuitive input method to a user, has been widely used in various electronic devices, such as cellular phones, personal digital assistants (PDAs), navigation devices, and the like. In particular, as the demand for smartphones has recently increased, the use of a touchscreen capable of providing various data input methods in a limited form factor has increased.

A touchscreen used in portable devices may be mainly classified as a resistive type touchscreen or a capacitive type touchscreen depending on a method of sensing a touch utilized thereby. Here, the capacitive type touchscreen has advantages in that it has a relatively long lifespan and various data input methods and gestures are easily implementable therewith, such that the use thereof has correspondingly increased. In particular, a multi-touch interface may be more easily implemented with the capacitive type touchscreen as compared to the resistive type touchscreen, such that the capacitive type touchscreen is widely used in devices, such as smartphones, and the like.

The capacitive type touchscreen includes a plurality of electrodes having a predetermined pattern, in which the plurality of electrodes defines a plurality of nodes in which the changes in capacitance are generated by a touch. In the plurality of nodes distributed on a two-dimensional plane, a change in self-capacitance or a change in mutual-capacitance is generated by the touch. Coordinates of the touch may be calculated by applying a weighted average calculation method, and the like, to the changes in capacitance generated in the plurality of nodes. In this case, an analog-to-digital converter (ADC) is used to convert analog signals, such as the changes in capacitance, and the like, generated in the plurality of nodes, into digital signals. Here, as a resolution of the analog-to-digital converter (ADC) is increased, the sensitivity and performance of the touch sensing device are improved. However, when a high-specification analog-to-digital converter (ADC) is used to design a touch sensing device having improved sensitivity and performance, an area of the analog-to-digital converter (ADC) may be increased and manufacturing costs may be increased.

Patent Document 1 relates to a readout circuit unit, having a difference between two sensing voltage values each stored in a sensing block applied thereto by using a sigma delta principle applied to a touchscreen device to generate a delta voltage and provide the delta voltage as an N-bit digital signal. However, Patent Document 1 does not disclose a feature of feeding back voltage depending on the changes in capacitance generated in the touchscreen.

RELATED ART DOCUMENT (Patent Document 1) Korean Patent Laid-Open Publication No. 10-2011-0026812

SUMMARY OF THE INVENTION

An aspect of the present invention provides a touch sensing device and a touchscreen device capable of effectively removing noise generated in an integrating circuit unit, while reducing the volume and cost of products.

According to an aspect of the present invention, there is provided a touch sensing device, including: a buffer unit including a buffer capacitor charged and discharged by a first voltage and a second voltage input at a predetermined period; an integrating circuit unit integrating a charging voltage of the buffer capacitor; a signal conversion unit comparing a voltage output from the integrating circuit unit with a predetermined reference voltage to generate the second voltage; and a touch determination unit counting the second voltage with a predetermined reference clock to determine a touch.

The buffer unit may include: a first switch connecting the first voltage to a first node of the buffer capacitor; and a second switch connecting the second voltage to the first node of the buffer capacitor.

The first switch and the second switch may perform a switching operation, having a phase difference of 180° with respect to each other.

The integrating circuit unit may include: an operational amplifier including a non-inverting terminal connected to a ground terminal; a third switch connecting a second node of the buffer capacitor to the ground terminal; a fourth switch connecting the second node of the buffer capacitor to an inverting terminal of the operational amplifier; and a feedback capacitor connecting the inverting terminal and an output terminal of the operational amplifier.

The third switch may perform a switching operation at the same interval as the first switch and the fourth switch may perform a switching operation at the same interval as the second switch.

The signal conversion unit may include: a comparator including an inverting terminal having the output voltage of the integrating circuit unit applied thereto and a non-inverting terminal having the reference voltage applied thereto; and an inverter inverting a voltage output from the comparator.

A level of the reference voltage may be the same as that of a ground voltage.

An average voltage level of the second voltage may follow a level of the first voltage.

The buffer unit and the integrating circuit unit may be provided in plural, the plurality of buffer units and the plurality of integrating circuit units being alternately positioned, and an n-th positioned integrating circuit unit may apply the first voltage to an N+1-st positioned buffer unit, and a finally positioned integrating circuit unit may be connected to the signal conversion unit.

An initially positioned buffer unit may be connected to sensing electrodes of a touch panel unit.

An average voltage level of the second voltage may follow a charging voltage level of a node capacitor provided in the sensing electrodes.

According to another aspect of the present invention, there is provided a touchscreen device, including: a panel unit including a plurality of driving electrodes, a plurality of sensing electrodes, and a plurality of node capacitors formed at points of intersection between the plurality of driving electrodes and the plurality of sensing electrodes; a driving circuit unit applying a driving signal having a predetermined driving period to the respective driving electrodes; a sensing circuit unit connected to the plurality of sensing electrodes to detect changes in capacitance generated in the node capacitors; a signal conversion unit comparing a voltage output from the sensing circuit unit with a predetermined reference voltage; and a touch determination unit counting a voltage output from the signal conversion unit with a predetermined reference clock to determine a touch, wherein an average level of the output voltage of the sensing circuit unit follows a level of voltage output from the node capacitor.

The sensing circuit unit may include: a buffer unit including a buffer capacitor receiving a charging voltage of the node capacitor and the output voltage of the sensing circuit unit at a predetermined period to perform charging and discharging; and an integrating circuit unit integrating a charging voltage of the buffer capacitor.

The buffer unit may include: a first switch connecting the charging voltage of the node capacitor to a first node of the buffer capacitor; and a second switch connecting the voltage output from the sensing circuit unit to the first node of the buffer capacitor.

The signal conversion unit may include: a comparator including an inverting terminal having the output voltage of the sensing circuit unit applied thereto and a non-inverting terminal having the reference voltage applied thereto; and an inverter inverting a voltage output from the comparator.

A level of the reference voltage may be the same as that of a ground voltage.

The touch determination unit may compare a count value generated by counting the output voltage of the sensing circuit unit with a predetermined reference clock with a predetermined reference count value to determine at least one of whether a touch is present, a gesture, and the number of touches.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
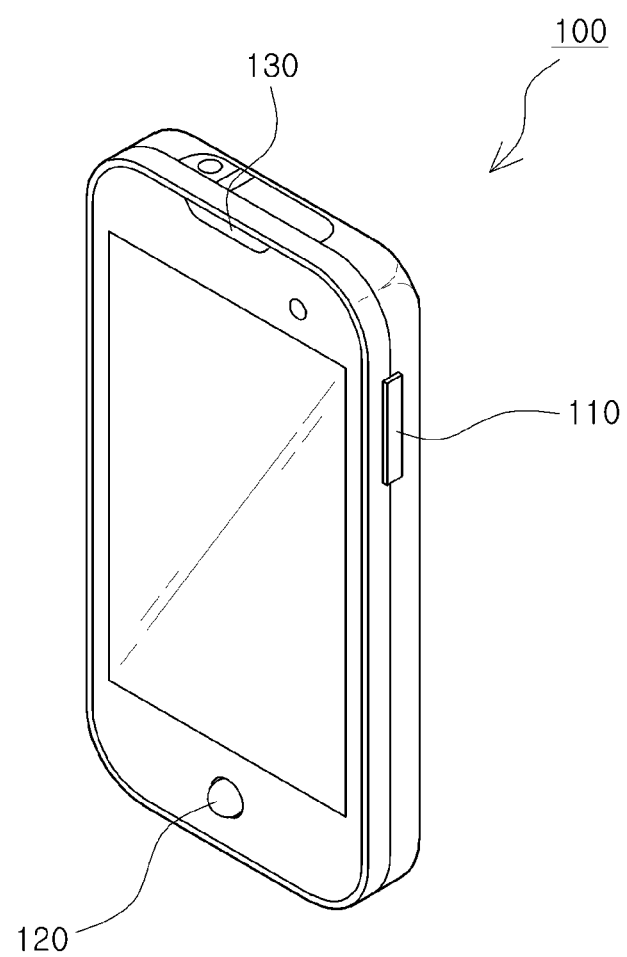
FIG. 1 is a perspective view illustrating an appearance of an electronic device including a touch sensing device according to an embodiment of the present invention.

Throughout the drawings, the same or like reference numerals will be used to designate the same or like elements FIG. 1 is a perspective view illustrating an appearance of an electronic device including a touch sensing device according to an embodiment of the present invention.

Referring to FIG. 1, an electronic device 100 according to the embodiment of the invention may include a display device 110 outputting an image, an input unit 120, an audio unit 130 outputting audio, and a touch sensing device integrated with the display device 110.

As shown in FIG. 1, in the case of a mobile device, the touch sensing device is generally provided in a state in which it is integrated with the display device, and needs to have a degree of light transmissivity high enough to transmit an image displayed by the display device. Therefore, the touch sensing device may be implemented by forming sensing electrodes using a transparent and electrically conductive material such as indium tin oxide (ITO), indium zinc oxide (IZO), zinc oxide (ZnO), carbon nanotubes (CNT), or graphene on a base substrate formed of a transparent film material such as polyethylene telephtalate (PET), polycarbonate (PC), polyethersulfone (PES), polyimide (PI), or the like. The display device may include a wiring pattern disposed in a bezel region thereof, wherein the wiring pattern is connected to the sensing electrodes formed of the transparent and conductive material. Since the wiring pattern is visually shielded by the bezel region, it may also be formed of a metal such as silver (Ag), copper (Cu), or the like.

Since it is assumed that the touch sensing device according to the embodiment of the present invention is operated according to a capacitive scheme, the touch sensing device may include a plurality of electrodes having a predetermined pattern. Further, the touch sensing device may include a capacitance sensing circuit detecting changes in capacitance generated in the plurality of electrodes, an analog-to-digital conversion circuit converting a signal output from the capacitance sensing circuit into a digital value, an operation circuit determining a touch using a data converted into a digital value, and the like.

Figure 2:
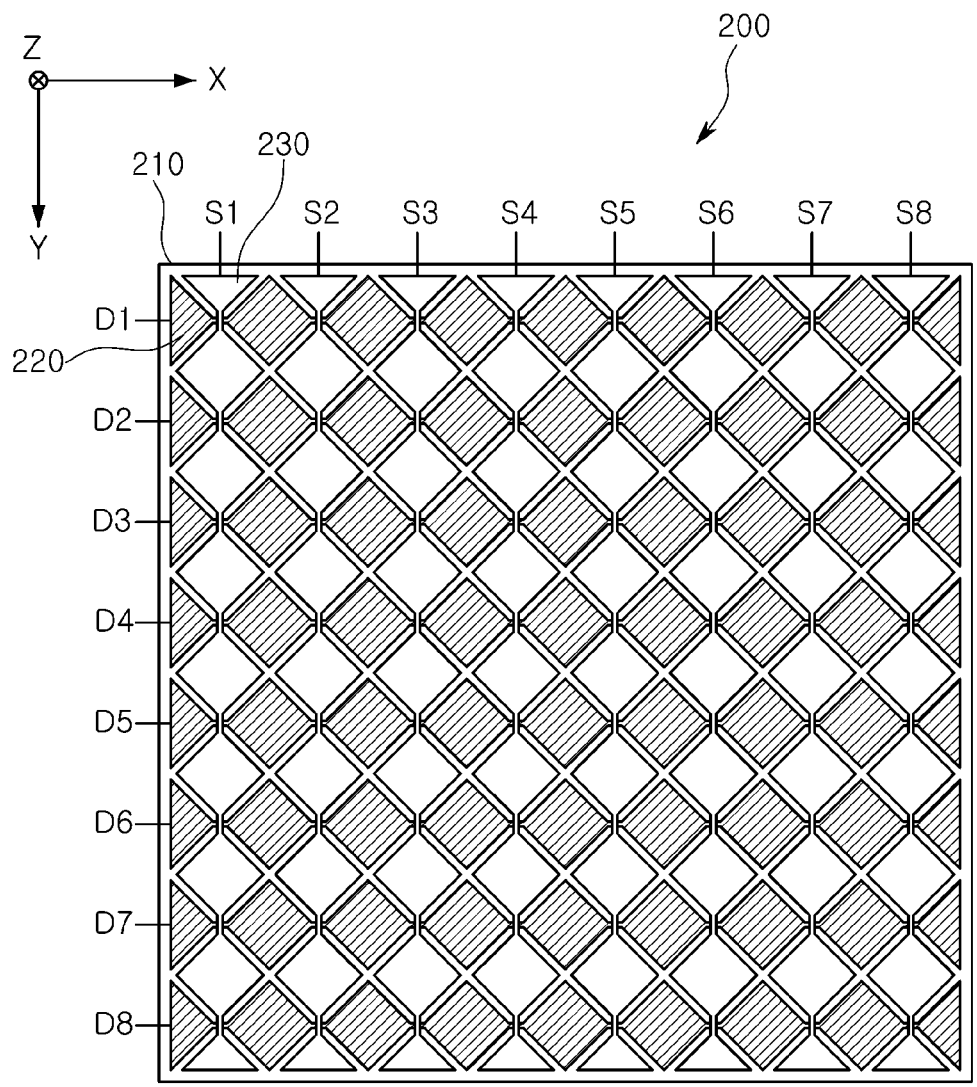
FIG. 2 is a diagram illustrating a panel unit applicable to the touch sensing device according to the embodiment of the present invention.

FIG. 2 is a diagram illustrating a panel unit applicable to the touch sensing device according to the embodiment of the present invention.

Referring to FIG. 2, a panel unit according to the embodiment of the invention may include a substrate 210 and a plurality of electrodes 220 and 230 disposed on the substrate 210. Although not illustrated in FIG. 2, each of the plurality of electrodes 220 and 230 may be electrically connected to a wiring pattern of a circuit board attached to one end of the substrate 210 through a wiring and a bonding pad. The circuit board may have a controller integrated circuit mounted thereon to thereby detect a sensing signal generated in the plurality of first and second electrodes 220 and 230 and determine a touch from the sensing signal.

In the case of a touchscreen device, the substrate 210 may be a transparent substrate on which the plurality of electrodes 220 and 230 are formed and the transparent substrate may be formed of plastic, such as polyimide (PI), polymethylmethacrylate (PMMA), polyethyleneterephthalate (PET), and polycarbonate (PC), or tempered glass. Further, in addition to a region in which the plurality of electrodes 220 and 230 are formed, a region in which the wirings connected to the plurality of electrodes 220 and 230 are disposed may be formed, a predetermined printed region for visually shielding the wirings generally formed of non-transparent metals may be formed on the substrate 210.

The plurality of electrodes 220 and 230 may be disposed on one or both surfaces of the substrate 210 and may be formed of indium tin-oxide (ITO), indium zinc-oxide (IZO), zinc oxide (ZnO), carbon nanotubes (CNT), a graphene based material, and the like, that are transparent and have electrical conductivity, in the case of the touchscreen device. FIG. 2 illustrates the plurality of electrodes 220 and 230 having a diamond-shaped pattern, but the plurality of electrodes 220 and 230 may have various polygonal shapes, such as a rectangular shape, a triangular shape, and the like.

The plurality of electrodes 220 and 230 include first electrodes 220 extending in an X-axis direction and second electrodes 230 extending in a Y-axis direction. The first electrodes 220 and the second electrodes 230 are disposed on both surfaces of the substrate 210 or are disposed on different substrates in an intersecting manner. In the case in which both the first electrodes 220 and the second electrodes 230 are disposed on one surface of the substrate 210, a predetermined insulating layer may be partially formed at points of intersection between the first electrodes 220 and the second electrodes 230.

A touch sensing device, in which the plurality of electrodes 220 and 230 are electrically connected to sense a touch, detects changes in capacitance generated in the plurality of electrodes 220 and 230 by the touch and senses the touch from the detected changes in capacitance. The first electrodes 220 may be connected to channels defined as D1 to D8 in a controller integrated circuit to have a predetermined driving signal applied thereto, and the second electrodes 230 may be connected to channels defined as S1 to S8 to be used for the touch sensing device to detect a sensing signal. In this case, the controller integrated circuit may detect changes in mutual capacitance generated between the first and second electrodes 220 and 230 based on the sensing signal and be operated in a manner of sequentially applying the driving signal to each of the first electrodes 220 and simultaneously detecting changes in capacitance from the second electrodes 220.

Figure 3:
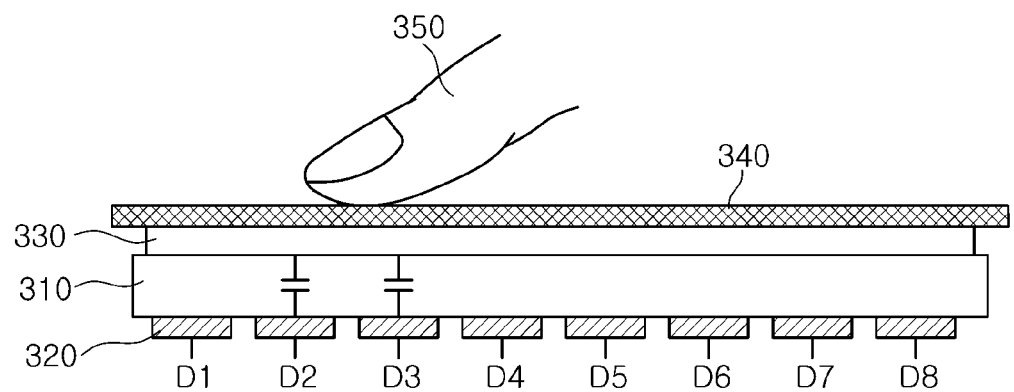
FIG. 3 is a diagram illustrating a section of the panel unit illustrated in FIG. 2.

FIG. 3 is a diagram illustrating a section of the panel unit illustrated in FIG. 2. FIG. 3 is a cross-sectional view of the panel unit 200 illustrated in FIG. 2 taken along a Y-Z plane and may include a substrate 310 and a plurality of sensing electrodes 320 and 330 and may further include a cover lens 340 receiving a touch applied thereto. The cover lens 340 is disposed on the second electrodes 330 used to detect a sensing signal to receive a touch from a touching object 350, such as a finger, or the like, applied thereto.

When the driving signal is sequentially applied to the first electrodes 320 through the channels D1 to D8, the mutual capacitance is generated between the first electrodes 320 to which the driving signal is applied and the second electrodes 330. When the driving signal is sequentially applied to the first electrodes 320, the change in mutual capacitance is generated i between the first and second electrodes 320 and 330 that are adjacent to the region touched by the touching object 350. The change in capacitance may be in proportion to an area of an overlapping region between the touching object 350 and the first and second electrodes 320 and 330 to which the driving signal is applied. In FIG. 3, the mutual capacitance generated between the first and second electrodes 320 and 330 connected to the channels D2 and D3 is affected by the touching object 350.

Figure 4:
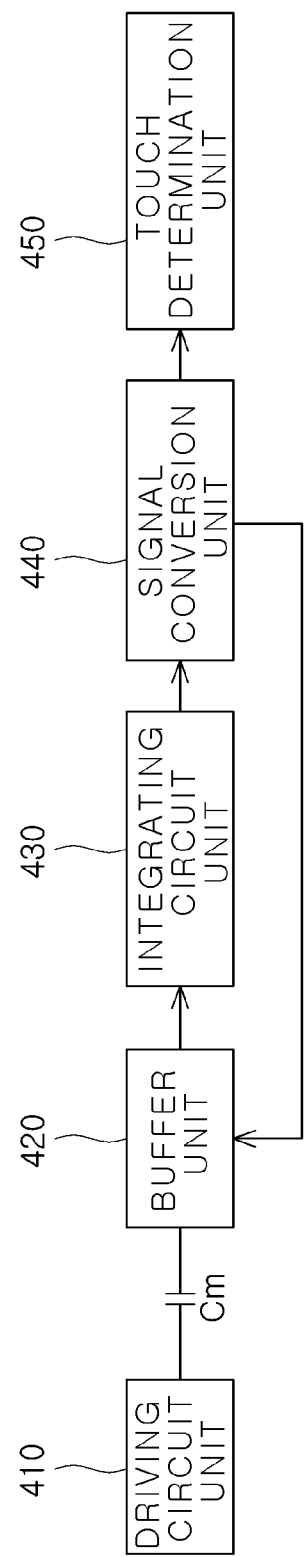
FIG. 4 is a block diagram illustrating the touch sensing device according to the embodiment of the present invention.

FIG. 4 is a block diagram illustrating the touch sensing device according to the embodiment of the present invention. Referring to FIG. 4, the touch sensing device according to the embodiment of the invention may include a driving circuit unit 410, a buffer unit 420, an integrating circuit unit 430, a signal conversion unit 440, and a touch determination unit 450. A node capacitor Cm in which a change in capacitance to be measured is generated may be connected between the driving circuit unit 410 and the buffer unit 420. The node capacitor Cm may be charged with the capacitance to be measured by the capacitance sensing device according to the embodiment of the present invention. As an example, the node capacitor Cm may correspond to mutual capacitance generated between the plurality of electrodes included in the capacitive type touchscreen. Hereinafter, for convenience of explanation, it is assumed that the touch sensing device according to the embodiment of the invention senses changes in capacitance generated in the capacitive type touchscreen.

The driving circuit unit 410 may generate a predetermined driving signal for charging the capacitor Cm and supply the generated driving signal to the node capacitor Cm. The driving signal may be a square wave signal having a pulse form and may have a predetermined frequency.

The buffer unit 420 includes at least one buffer capacitor that may be charged and discharged by receiving voltage charged in the node capacitor Cm and voltage output from the signal conversion unit 440 at different intervals. In this case, as an example, the voltage charged in the node capacitor and the voltage output from the signal conversion unit 440 have the same duty, but may be transferred to the buffer capacitor, having a phase difference of 180° with respect to each other.

The integrating circuit unit 430 includes at least one feedback capacitor charged and discharged by receiving charges charged in the buffer capacitor Cm and the integrating circuit unit 430 generates an output voltage from the charges charged and discharged in and from the feedback capacitor.

The signal conversion unit 440 compares the voltage output from the integrating circuit unit 430 with a predetermined reference voltage to generate a high or low level of output voltage. As an example, the high or low level of voltage output from the signal conversion unit 440 may each be set to be voltage having a level of +1V or −1V. The voltage output from the signal conversion unit 440 is supplied to the buffer unit 420 and the touch determination unit 450.

The touch determination unit 450 counts the voltage output from the signal conversion unit 440 with a reference clock to determine the touch. As an example, the touch determination unit 450 may compare the count value with a predetermined reference count value to determine whether a touch has been made, a form of a gesture, or the number of touches that have been made.

Figure 5:
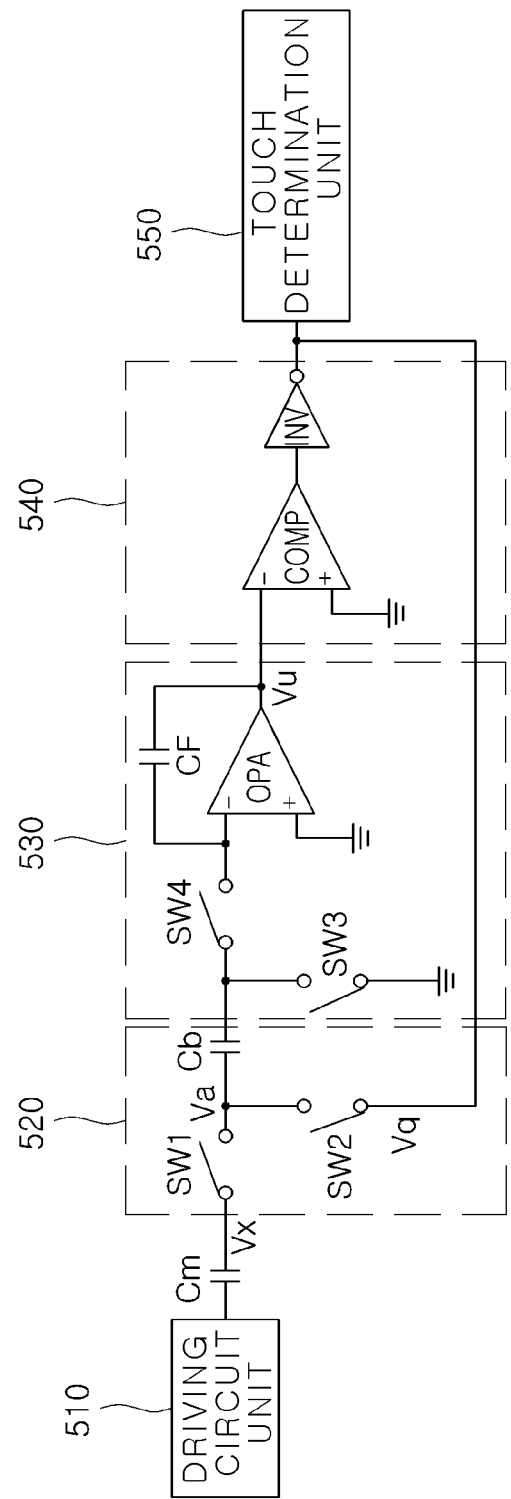
FIG. 5 is a circuit diagram schematically illustrating the touch sensing device according to the embodiment of the present invention.

FIG. 5 is a circuit diagram schematically illustrating the touch sensing device according to the embodiment of the present invention. Referring to FIG. 5, the touch sensing device according to the embodiment of the invention may include a driving circuit unit 510, a buffer unit 520, an integrating circuit unit 530, a signal conversion unit 540, and a touch determination unit 550. The driving circuit unit 510 and the touch determination unit 550 are the same as the driving circuit unit 410 and the touch determination unit 450 of FIG. 4 and thus, a detailed description thereof will be omitted.

The buffer unit 520 may include a buffer capacitor Cb and switches SW1 and SW2. The switch SW1 may be disposed between a first node of the buffer capacitor Cb and the node capacitor Cm and the switch SW2 may be disposed between the first node of the buffer capacitor Cb and an output terminal of the signal conversion unit 540.

The integrating circuit unit 530 may include switches SW3 and SW4, a feedback capacitor CF, and an operational amplifier OPA. The switch SW3 connects a second node of the buffer capacitor Cb to a ground terminal and the switch SW4 may be disposed between the second node of the buffer capacitor Cb and an inverting terminal of the operational amplifier OPA. A non-inverting terminal of the operational amplifier is connected to the ground terminal and the feedback capacitor CF may be disposed between the inverting terminal and an output terminal of the operational amplifier.

The signal conversion unit 540 compares the output of the integrating circuit unit 530 with a predetermined reference voltage to generate a high or low level of output voltage. As illustrated in FIG. 5, the signal conversion unit 540 may include a comparator COMP and an inverter INV. An inverting terminal of the comparator COMP is connected to an output terminal of the integrating circuit unit 530 and a non-inverting terminal of the comparator COMP is connected to the ground terminal. An output terminal of the comparator COMP is connected to an input terminal of the inverter INV, such that the output from the comparator COMP is inverted in the inverter INV. In this case, it can be appreciated that the foregoing level of predetermined reference voltage from the ground terminal connected to a non-inverting terminal of the comparator COMP is the same as the level of ground voltage. However, this is merely exemplary, and therefore may be changed to another level of voltage. In addition, the signal conversion unit 540 illustrated in FIG. 5 is merely exemplary, and the signal conversion unit 540 connects the output terminal of the integrating circuit unit 530 to the non-inverting terminal of the comparator COMP and connects the inverting terminal of the comparator COMP to the ground terminal, such that the signal conversion unit 540 may be implemented without the inverter INV.

Figure 6:
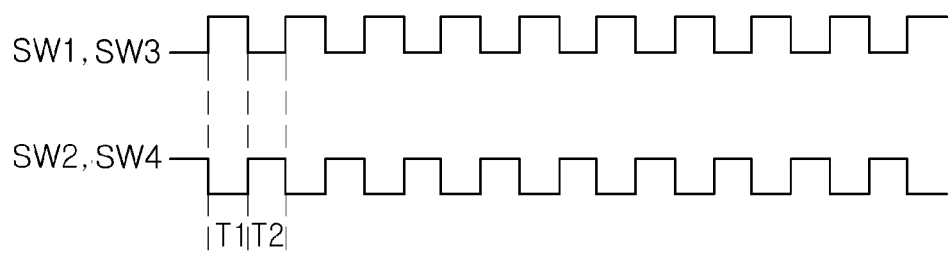
FIG. 6 is a diagram illustrating a clock signal applied to switches included in the touch sensing device according to the embodiment of the present invention.

FIG. 6 is a diagram illustrating a clock signal applied to switches included in the touch sensing device according to the embodiment of the present invention. When a clock signal applied to the switches SW1 to SW4 is at a high level, the switches SW1 to SW4 are turned on, and when the clock signal is at a low level, the switches SW1 to SW4 are turned off. Hereinafter, an operation of the touch sensing device according to the embodiment of the invention will be described with reference to FIGS. 5 and 6.

In section T1, the switches SW1 and SW3 are turned on and the switches SW2 and SW4 are turned off. In this case, a charge depending on a charging voltage Vx of the node capacitor Cm is transferred to the buffer capacitor Cb, such that the buffer capacitor Cb is charged. A voltage Va of the first node of the buffer capacitor Cb is increased to the level of charging voltage Vx.

In section T2, the switches SW2 and SW4 are turned on and the switches SW1 and SW3 are turned off. The switches SW2 and SW4 are turned on at a start point of section T2, such that the voltage Va of the first node of the buffer capacitor Cb is changed to a level of voltage depending on a difference between the charging voltage Vx of the buffer capacitor and an output voltage Vq of the signal conversion unit 540.

Next, a charge depending on the voltage Vx−Vq maintained at the first node of the buffer capacitor Cb is transferred to the feedback capacitor CF, such that the output voltage is generated in the output terminal of the operational amplifier OPA.

In a case in which integrating section T1 and integrating section T2 are assumed as a single cycle, the following Equation 1 is established. Here, k represents the number of cycles.

$$Vu(k+1)=Vu(k)+Va(k)$$

$$Va(k)=Vx(k)-Vq(k) \qquad \text{Equation 1}$$

In an early stage (k=0), the charging voltage Vx(0) of the node capacitor Cm is assumed to be 0.4V and the output voltage Vu(0) of the operational amplifier OPA is assumed to be 0.1V and the high and low level of voltage output from the comparator COMP is assumed to be 1V and −1V. Hereinafter, the operation of the touch sensing device according to the embodiment of the invention will be described in detail.

In the early stage (k=0), the output voltage Vu(0) of the operational amplifier OPA is 0.1V, such that the output voltage of the comparator COMP becomes −1V and the output voltage Vq (0) of the inverter INV becomes 1V. Therefore, Va(0)=Vx(0)−Vq(0)=0.4−1=−0.6V, Vu(1)=Vu(0)+Va(0) =0.1−0.6=−0.5. Arranging the repeated process as described above, results as shown in Table 1 may be confirmed.

TABLE 1

| k | Va(k) | Vu(k) | Vq(k) | Vq(k)ave |
|---|-------|-------|-------|----------|
| 0 | −0.6  | 0.1   | 1.0   | 1.0      |
| 1 | 1.4   | −0.5  | −1.0  | 0        |
| 2 | −0.6  | 0.9   | 1.0   | 0.33     |
| 3 | −0.6  | 0.3   | 1.0   | 0.50     |
| 4 | 1.4   | 1.1   | −1.0  | 0.20     |
| 5 | −0.6  | 0.5   | 1.0   | 0.33     |
| 6 | −0.6  | −0.4  | 1.0   | 0.429    |
| 7 | 1.4   | −0.1  | −1.0  | 0.25     |
| 8 | −0.6  | 1.3   | 1.0   | 0.33     |
| 9 | −0.6  | 0.7   | 1.0   | 0.4      |

In Table 1, Vq(k)ave represents an average value of the output voltage Vq(k) of the signal conversion unit 540. It may be appreciated that in a ninth cycle, the Vq(k) ave value, 0.4V, is the same as the charging voltage Vx of the initial node capacitor Cm. That is, the output voltage of the signal conversion unit 540 follows the charging voltage of the node capacitor Cm, such that the touch determination unit 550 may count the output voltage of the signal conversion unit 540 with a predetermined reference clock to determine whether a touch has been made. Specifically, the high or low level of voltage Vq is counted with the predetermined reference clock and it may be determined from the variation of the count for a predetermined time whether the touch has been made. In addition, it may be determined whether a touch has been made by comparing a count value generated by counting the voltage Vq with the predetermined reference clock with a predetermined reference count value.

Since the touch sensing device according to the embodiment of the invention counts the high or low level of voltage output from the signal conversion unit 540 with the reference clock to determine the touch, the touch sensing device may be implemented without a high-performance analog-to-digital converter. Therefore, the cost and volume of the touch sensing device may be reduced.

The touch sensing device according to the embodiment of the invention includes the buffer unit 520, the integrating circuit unit 530, and the signal conversion unit 540 and applies an operational principle of a delta-sigma analog-to-digital converter. The operational principle of the delta-sigma analog-to-digital converter may be applied to the touch sensing device according to the embodiment of the invention to thereby effectively remove noise generated in the integrating circuit unit 530, in particular, the operational amplifier OPA. The operational principle of the delta-sigma analog-to-digital converter is well-known, and thus, a detailed description thereof will be omitted.

Figure 7:
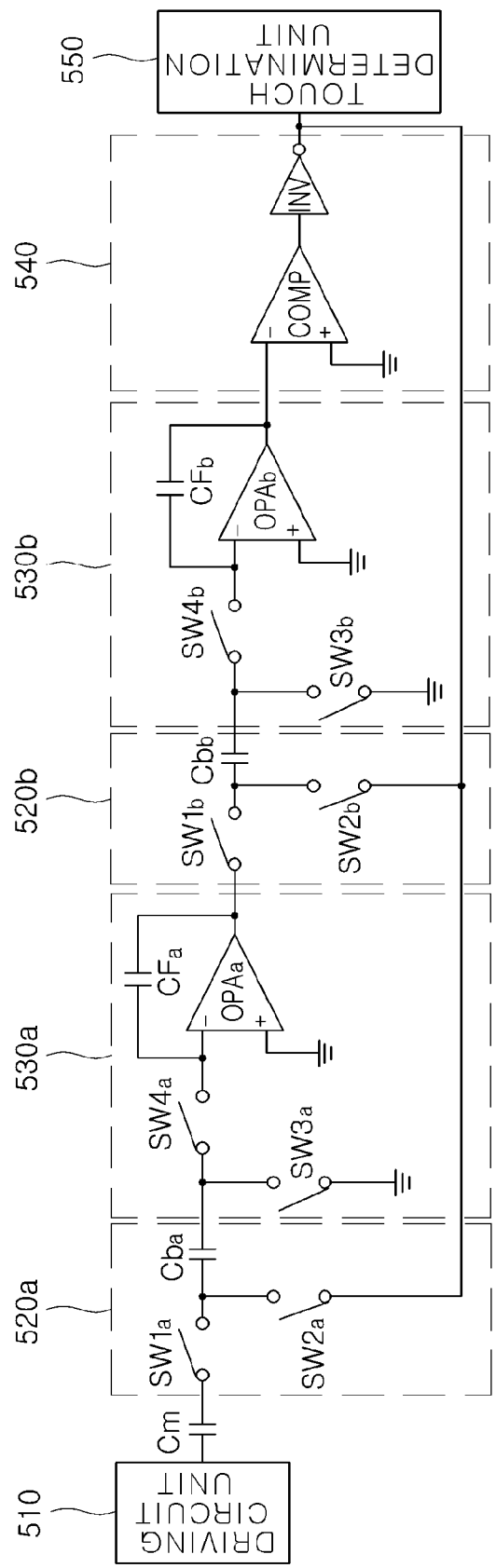
FIG. 7 is a circuit diagram schematically illustrating a touch sensing device according to another embodiment of the present invention.

The touch sensing device according to the embodiment of the invention includes one buffer unit 520, one integrating circuit unit 530, and one signal conversion unit 540, such that a primary delta-sigma analog-to-digital converter is implemented therein. However, the inventive concept is not limited thereto, and therefore may be extendedly applied to a high order delta-sigma analog-to-digital converter. For example, the touch sensing device to which an operational principle of a secondary delta-sigma analog-to-digital converter is applied may be implemented by including a driving circuit unit 510, a buffer unit 520a, an integrating circuit unit 530a, a buffer unit 520b, an integrating circuit unit 530b, a signal conversion unit 540, and a touch determination unit 550 as illustrated in FIG. 7. In addition, a tertiary delta-sigma analog-to-digital converter may be implemented by including a buffer unit, an integrating circuit unit, a buffer unit, an integrating circuit unit, a buffer unit, an integrating circuit unit and a signal conversion unit.

Figure 8:
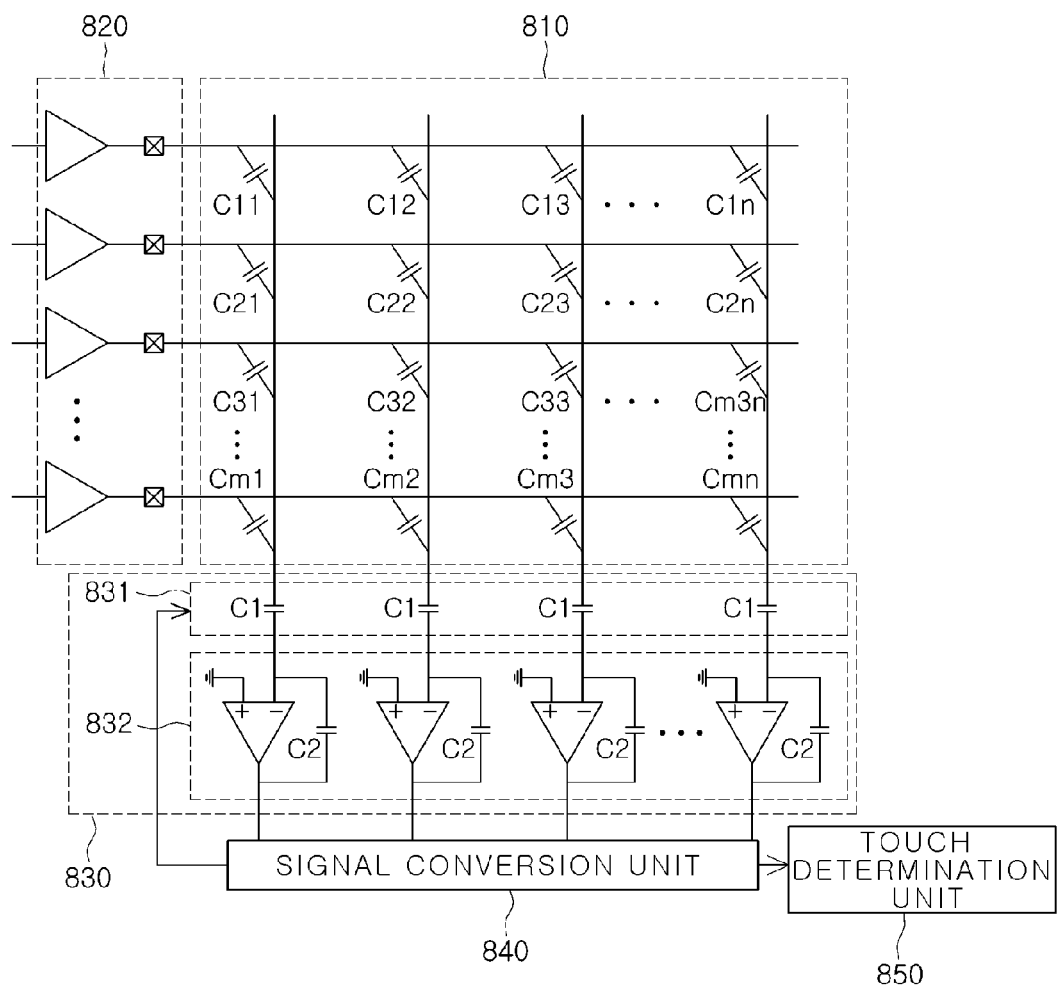
FIG. 8 is a diagram showing a touchscreen device including the touch sensing device according to an embodiment of the present invention.

FIG. 8 is a diagram showing a touchscreen device including a touch sensing device according to an embodiment of the present invention. Referring to FIG. 8, a touchscreen device according to the embodiment of the invention may include a panel unit 810, a driving circuit unit 820, a sensing circuit unit 830, a signal conversion unit 840, and a touch determination unit 850.

The driving circuit unit 820, a buffer unit 831, an integrating circuit unit 832, the signal conversion unit 840, and the touch determination unit 850 of FIG. 8 correspond to the driving circuit units 410 and 510, the buffer units 420 and 520, the integrating circuit units 430 and 530, the signal conversion units 440 and 540, and the touch determination units 450 and 550 of FIGS. 4 and 5, and therefore the same description thereof will be omitted and only difference therebetween will be described.

The panel unit 810 may include a plurality of first electrodes extended in a first axial direction, that is, a horizontal direction in FIG. 8 and a plurality of second electrodes extended in a second axial direction, that is, a vertical direction in FIG. 8, intersecting with the first axial direction, wherein changes in capacitance C11 to Cmn are generated at points of intersection between the first and second electrodes. The changes in capacitance C11 to Cmn generated at points of intersection between the first and second electrodes may be changes in mutual capacitance generated by a driving signal applied to the first electrodes by the driving circuit unit 820. Meanwhile, the driving circuit unit 820, the sensing circuit unit 830, the signal conversion unit 840, and the touch determination unit 850 may be implemented as a single integrated circuit (IC).

The driving circuit unit 820 may apply a predetermined driving signal to the first electrodes of the panel unit 810. The driving signal may be a square wave signal, a sine wave signal, a triangle wave signal, or the like, having a predetermined period and amplitude, and be sequentially applied to the plurality of first electrodes. Although FIG. 8 shows that circuits for generating and applying the driving signal are individually connected to the plurality of first electrodes, respectively, a single driving signal generating circuit may be employed to generate a driving signal and apply the generated driving signal to the plurality of first electrodes, respectively, using a switching circuit.

The sensing circuit unit 830 includes the buffer unit 831 and the integrating circuit unit 832. The buffer unit 831 includes at least one capacitor C1 and is connected to each of the plurality of second electrodes, and the at least one capacitor C1 may be charged and discharged by the changes in capacitance C11 to Cmn and the voltage output from the signal conversion unit 840. The integrating circuit unit 832 may include at least one operational amplifier and at least one capacitor C2 having a predetermined capacity, and an inverting input terminal of the operational amplifier is connected to the buffer unit 831 to convert a change in a charging voltage of the buffer capacitor into an analog signal, such as a voltage signal, and the like and output the converted signal. When the driving signal is sequentially applied to the plurality of first electrodes, respectively, the changes in capacitance may be simultaneously detected from the plurality of second electrodes, such that the number of operational amplifiers and capacitors may correspond to the number (n) of second electrodes.

The signal conversion unit 840 may compare the analog signal output from the sensing circuit unit 830 with a predetermined reference level to generate a high or low level of output voltage having +1V or −1V.

The touch determination unit 850 uses the output voltage of the signal conversion unit 840 to determine a touch applied to the panel unit 810. For example, high or low level of count values may be generated by counting the high or low level of voltage output from the signal conversion unit 840 with a predetermined reference clock, and at least one of whether a touch has been made, the coordinates, gesture, and number of touches may be determined from the count values.

As set forth above, according to embodiments of the invention, a touch sensing device and a touchscreen device can effectively remove noise generated in an integrating circuit unit, while reducing the volume and costs of products.

While the present invention has been shown and described in connection with the embodiments, it will be apparent to those skilled in the art that modifications and variations can be made without departing from the spirit and scope of the invention as defined by the appended claims.

What is claimed is:

1. A touch sensing device, comprising:
   a buffer unit including a first node of a buffer capacitor charged and discharged by a first voltage and a second voltage respectively input at a predetermined period;
   an integrating circuit unit integrating a charging voltage of a second node of the buffer capacitor, the charging voltage being an input of the integrating circuit unit;
   a signal conversion unit comparing a voltage output from the integrating circuit unit, which is based on the integrated charging voltage, with a predetermined reference voltage to generate the second voltage; and
   a touch determination unit counting the second voltage using a predetermined reference clock to determine a touch.

2. The touch sensing device of claim 1, wherein the buffer unit includes:
   a first switch connecting the first voltage to the first node of the buffer capacitor; and
   a second switch connecting the second voltage, which is generated and output by the signal conversion unit, to the first node of the buffer capacitor.

3. The touch sensing device of claim 2, wherein the first switch and the second switch perform a switching operation to cause the first voltage and the second voltage to have a phase difference of 180° with respect to each other.

4. The touch sensing device of claim 2, wherein the integrating circuit unit includes:
an operational amplifier including a non-inverting terminal connected to a ground terminal;
a third switch connecting the second node of the buffer capacitor to the ground terminal;
a fourth switch connecting the second node of the buffer capacitor to an inverting terminal of the operational amplifier; and
a feedback capacitor connecting the inverting terminal and an output terminal of the operational amplifier.

5. The touch sensing device of claim 4, wherein the third switch performs a switching operation at a same interval as the first switch, and
the fourth switch performs a switching operation at the same interval as the second switch.

6. The touch sensing device of claim 1, wherein the signal conversion unit includes:
a comparator including an inverting terminal having the voltage output from the integrating circuit unit applied thereto and a non-inverting terminal having the predetermined reference voltage applied thereto; and
an inverter inverting a voltage output from the comparator.

7. The touch sensing device of claim 6, wherein a level of the predetermined reference voltage is a same as that of a ground voltage.

8. The touch sensing device of claim 1, wherein an average voltage level of the second voltage follows a level of the first voltage.

9. The touch sensing device of claim 1, wherein the buffer unit and the integrating circuit unit are provided in plural, a plurality of buffer units and a plurality of integrating circuit units being alternately positioned,
an n-th positioned integrating circuit unit applies the first voltage to an N+1-st positioned buffer unit, and
a finally positioned integrating circuit unit is connected to the signal conversion unit.

10. The touch sensing device of claim 9, wherein an initially positioned buffer unit is connected to sensing electrodes of a touch panel unit.

11. The touch sensing device of claim 10, wherein an average voltage level of the second voltage follows a charging voltage level of a node capacitor provided in the sensing electrodes.

12. A touchscreen device, comprising:
a panel unit including a plurality of driving electrodes, a plurality of sensing electrodes, and a plurality of node capacitors formed at points of intersection between the plurality of driving electrodes and the plurality of sensing electrodes;
a driving circuit unit applying a driving signal having a predetermined driving period to the plurality of driving electrodes;
a sensing circuit unit connected to the plurality of sensing electrodes to detect changes in capacitance generated in the plurality of node capacitors, the sensing circuit unit further including:
a buffer unit including a first node of a buffer capacitor being charged and discharged by a first voltage and a second voltage respectively input at a predetermined period, and
an integrating circuit unit integrating a charging voltage of a second node of the buffer capacitor, the charging voltage being input to the integrating circuit unit;
a signal conversion unit comparing a voltage output from the sensing circuit unit with a predetermined reference voltage to generate the second voltage; and
a touch determination unit counting the second voltage, which is generated by the signal conversion unit, using a predetermined reference clock, to determine a touch.

13. The touchscreen device of claim 12, wherein the sensing circuit unit includes:
the buffer unit including the buffer capacitor receiving the first voltage of the node capacitor and the second voltage at a predetermined period to perform charging and discharging of the buffer capacitor.

14. The touchscreen device of claim 13, wherein the buffer unit includes:
a first switch connecting the first voltage of the node capacitor to the first node of the buffer capacitor; and
a second switch connecting the generated output voltage of the signal conversion unit to the first node of the buffer capacitor.

15. The touchscreen device of claim 12, wherein the signal conversion unit includes:
a comparator including an inverting terminal having the voltage output from the sensing circuit unit applied thereto and a non-inverting terminal having the predetermined reference voltage applied thereto; and
an inverter inverting a voltage output from the comparator.

16. The touchscreen device of claim 15, wherein a level of the predetermined reference voltage is the same as that of a ground voltage.

17. The touchscreen device of claim 12, wherein the touch determination unit compares a count value generated by counting the second voltage of the signal conversion unit with a predetermined reference clock with a predetermined reference count value to determine at least one of whether a touch is present, a gesture, and a number of touches.

18. A touch sensing device, comprising:
a driving circuit unit inputting a signal to a node capacitor that outputs a first voltage;
a first buffer unit including a first node of a first buffer capacitor charged and discharged by the first voltage output by the node capacitor and a second voltage, the first voltage and the second voltage being respectively input to the first buffer capacitor at a predetermined period;
a first integrating circuit unit integrating a charging voltage of a second node of the first buffer capacitor;
a second buffer unit including a first node of a second buffer capacitor charged and discharged by an output of the first integrating circuit unit and the second voltage, the output of the first integrating circuit unit and the second voltage being alternatively input to the second buffer capacitor;
a second integrating circuit unit integrating a charging voltage of a second node of the second buffer capacitor;
a signal conversion unit comparing a voltage output from the second integrating circuit unit, which is based on the integrated charging voltage of the second node of the second buffer capacitor, with a predetermined reference voltage to generate the second voltage; and
a touch determination unit counting the second voltage using a predetermined reference clock to determine a touch.

* * * * *